Inventor.
Martin Jelalian

April 16, 1935. M. JELALIAN 1,997,906
VERTICALLY RECIPROCATING WINGED NAVAL DIRIGIBLE AIRSHIP
Filed June 25, 1934. 6 Sheets-Sheet 5
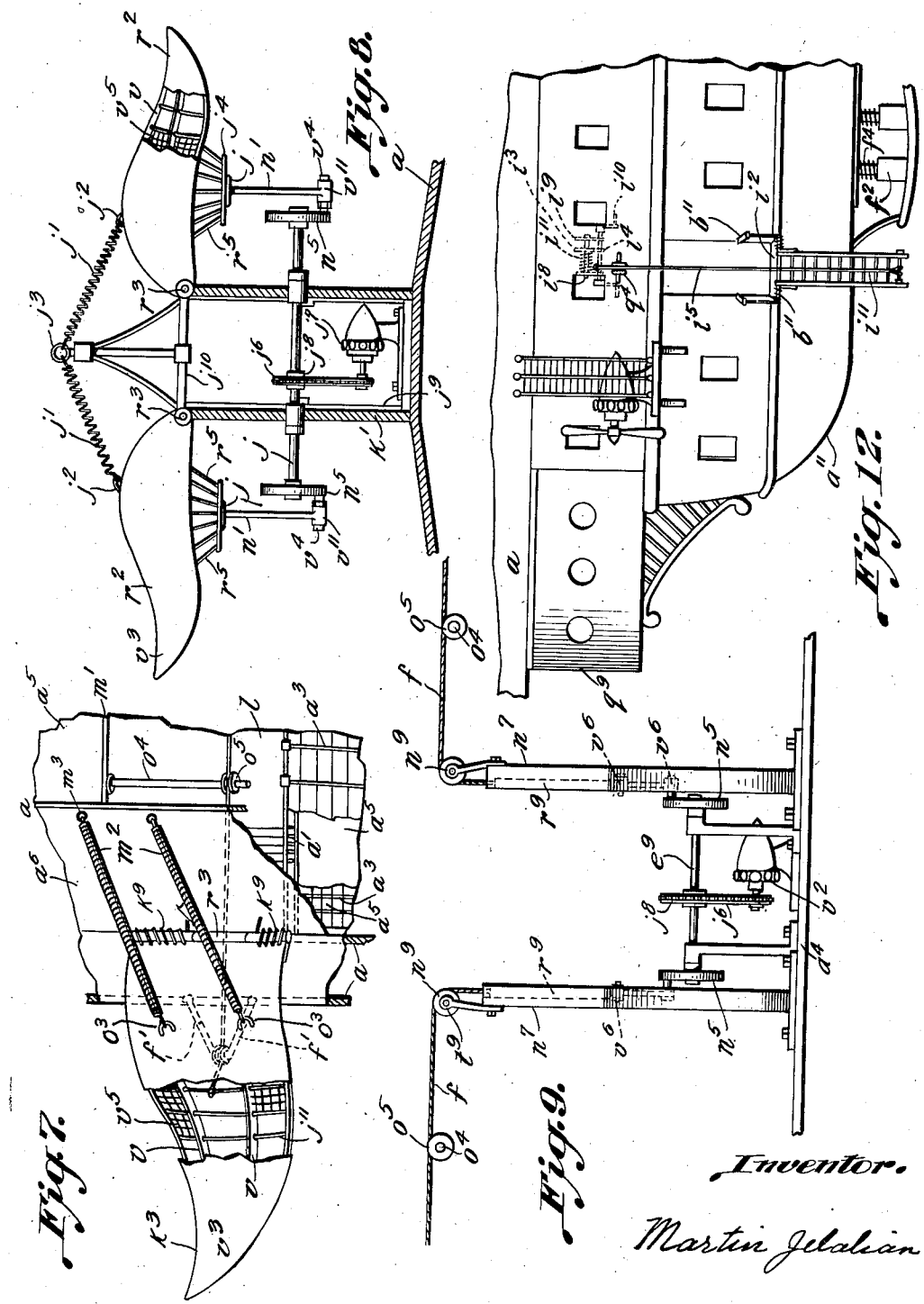
Inventor.
Martin Jelalian April 16, 1935. M. JELALIAN 1,997,906
VERTICALLY RECIPROCATING WINGED NAVAL DIRIGIBLE AIRSHIP
Filed June 25, 1934 6 Sheets-Sheet 6
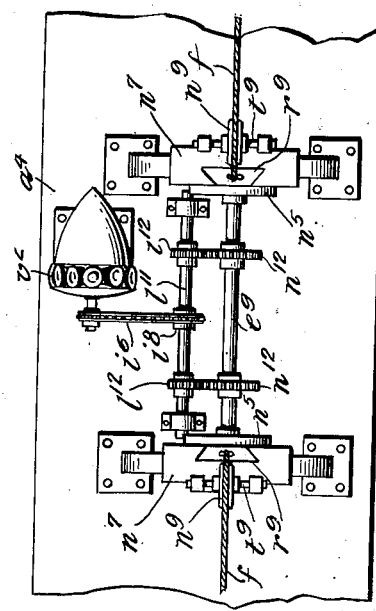
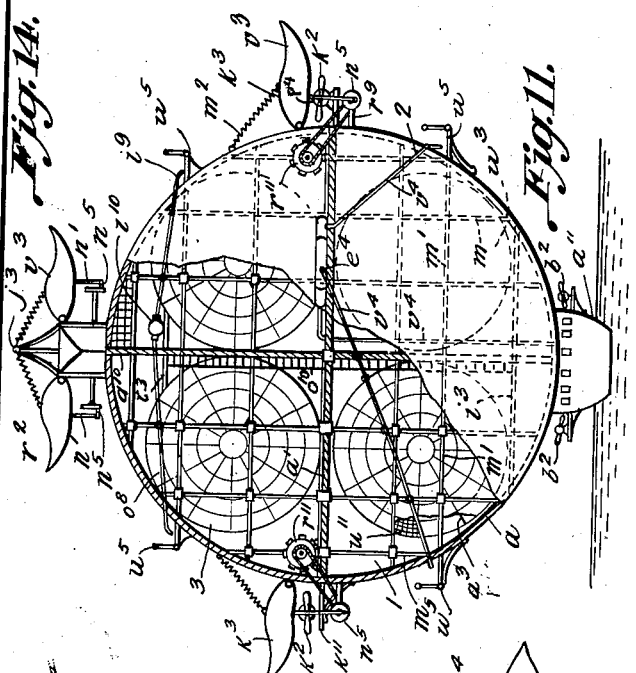
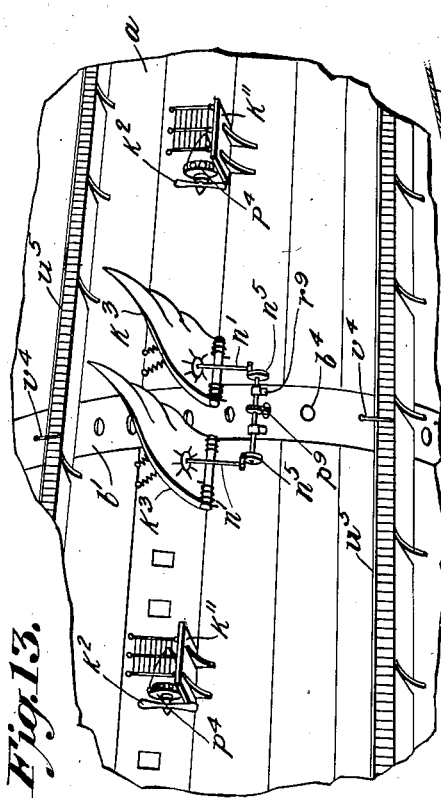
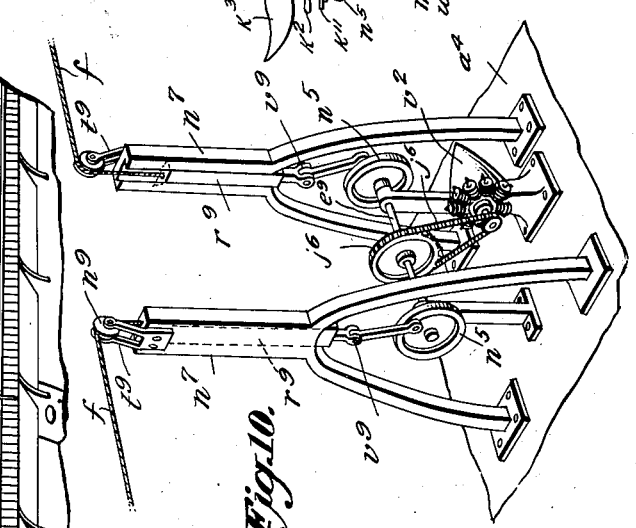
Inventor.
Martin Jelalian Patented Apr. 16, 1935

1,997,906

UNITED STATES PATENT OFFICE 1,997,906

VERTICALLY RECIPROCATING WINGED NAVAL DIRIGIBLE AIRSHIP

Martin Jelalian, New York, N. Y.

Application June 25, 1934, Serial No. 732,356

8 Claims. (Cl. 244—3)

The object of this invention is to provide a large, safe and speedy aircraft, capable of traveling on land and water, especially on water, to serve as a passenger craft for travelling a long distance.

The craft is arranged with a series of alike-sets of revolving propellers and also vertically reciprocating wings to propel the same forward and to afford the latter with a great amount of speed and an exceptionally great amount of lifting capacity, and the parts of the craft are so arranged that the same if desired may be conveniently equipped for military purpose.

The detailed description of the invention is illustrated in the accompanying six sheets of drawings forming a part of this specification in which:

Fig. 6 is an enlarged side detail view of one of the three main integral cars and also one of the minor wing supporting cars as located between each adjacent integral car and as relative with the gas-bag inclosing frame.

Fig. 7 shows the top detail view of one of the main centrally arranged vertically reciprocating wings as relative with the gas-bag inclosing frame and the spaces as arranged between each pair of adjacent gas-bag containing compartments, Fig. 8 is an enlarged transverse detail view of one of a pair of alike-sets of vertically reciprocating longitudinally extending gang-way compartment wings.

Fig. 9 is an enlarged front view of wing-rope operating arm connections for each pair of the centrally arranged main vertically reciprocating wings as arranged centrally within the spaces upon fixed platforms and each as provided with a chain connection with a motor located centrally upon the said platform.

Fig. 10 illustrates a side perspective view of Fig. 9.

Fig. 11 shows a transverse sectional detail view of the gas-bag inclosing frame, the gas-bags within the same arranged in a modified form.

Fig. 12 is an enlarged sectional detail view of the forward portion of the forward main integral car showing one of the alike-sets of pull-rope operated adjustable ladders as arranged opposite to the entrances upon the sides of the said main cars for the purpose of receiving in and also letting off passengers therefrom and the said ladder as in a normally released or lowered position.

Fig. 13 is a side sectional detail view of Fig. 11 and Fig. 14 showing an enlarged top plan view of one of the wing-shafts of the main centrally arranged vertically reciprocating wings in connection with a pair of opposite vertically arranged wing-rope supporting slideable members as located within the space of the adjacent compartments and said shaft as adapted to be driven by gear connections.

Figure 1:
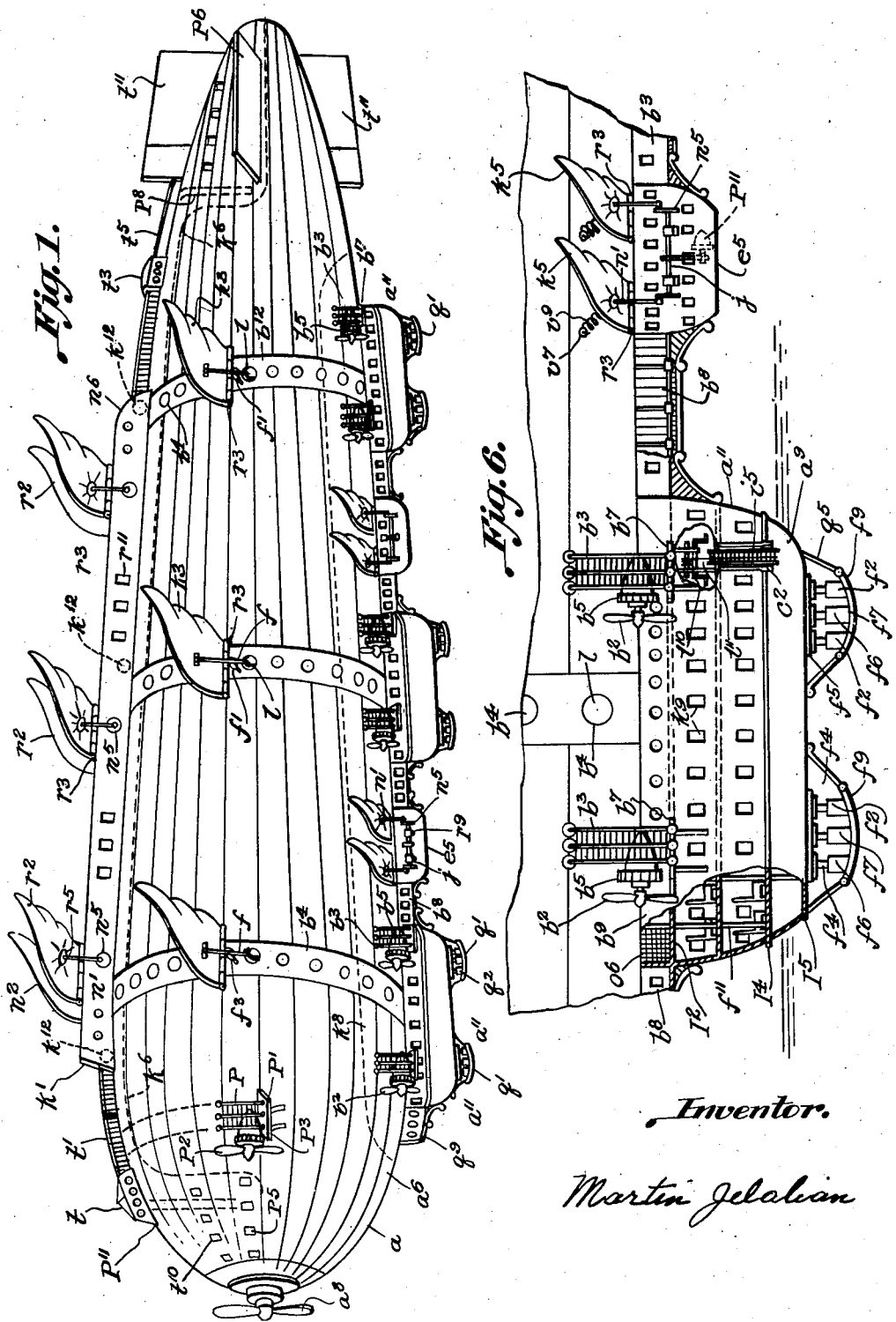
Fig. 1 is a side detailed elevation illustrating the arrangement of a series of its alike-sets of revolving propellers and vertically reciprocating wings as relative with the gas-bag inclosing frame and also integral cars as located beneath the latter.
Figure 2:
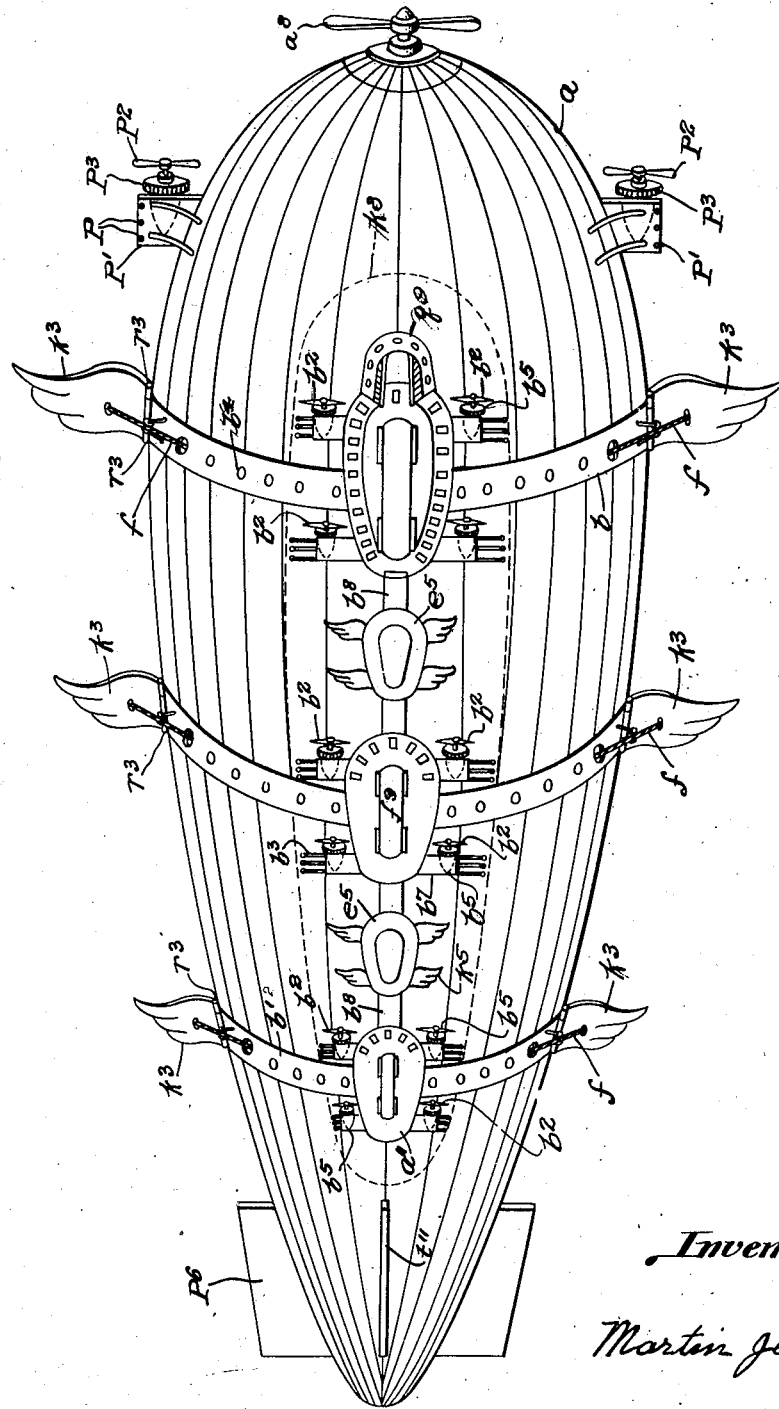
Fig. 2 is a front detailed perspective elevation of Fig. 1 showing the alike sets of main centrally arranged vertically reciprocating wings of the gas-bag inclosing frame and also a series of alike sets of revolving propellers which are driven by motors that are mounted upon the side projecting platforms of the main integral cars which are located beneath the said gas-bag inclosing frame.
Figure 3:
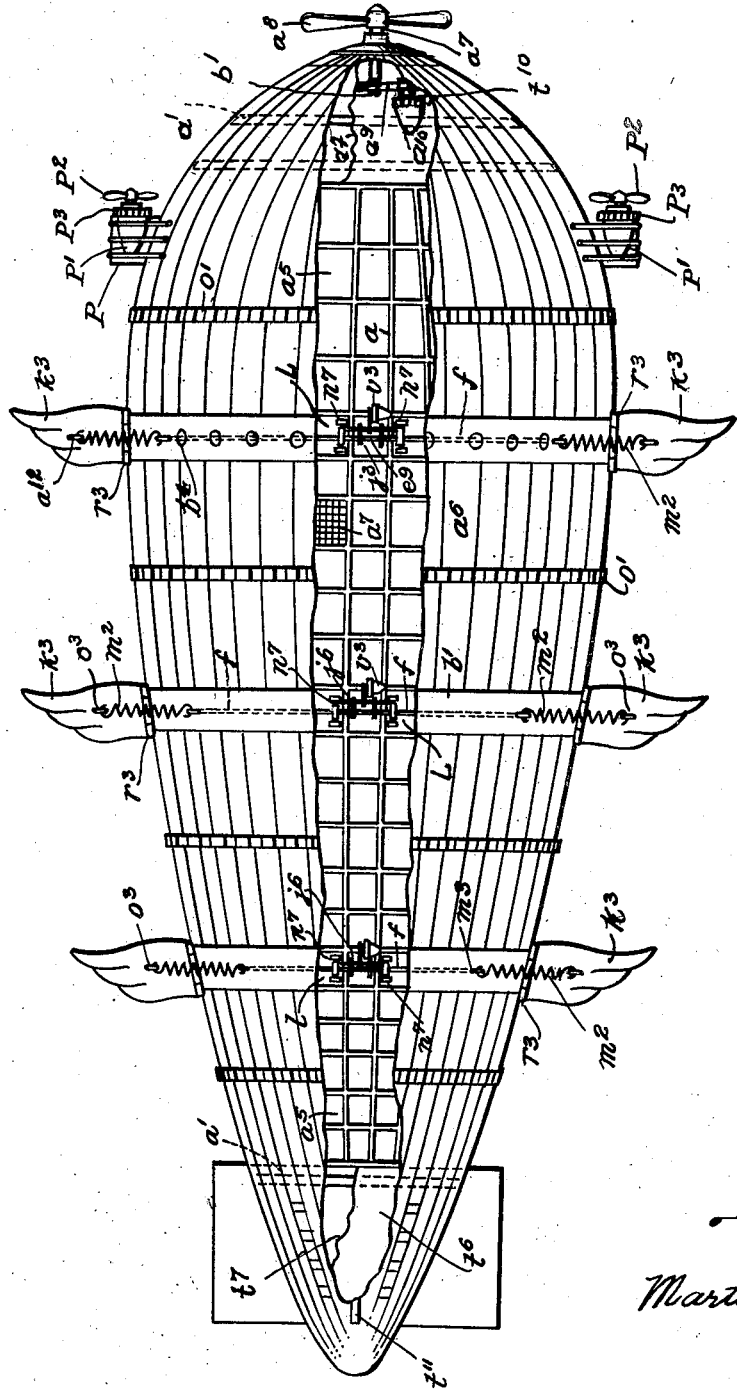
Fig. 3 illustrates a top plan view of the gas-bag inclosing frame with the longitudinally extending gang-way wing compartment as omitted and provided with its centrally arranged main vertically reciprocating wings and forwardly located revolving propellers and its outer layer as partly removed and showing its inner construction.
Figure 4:
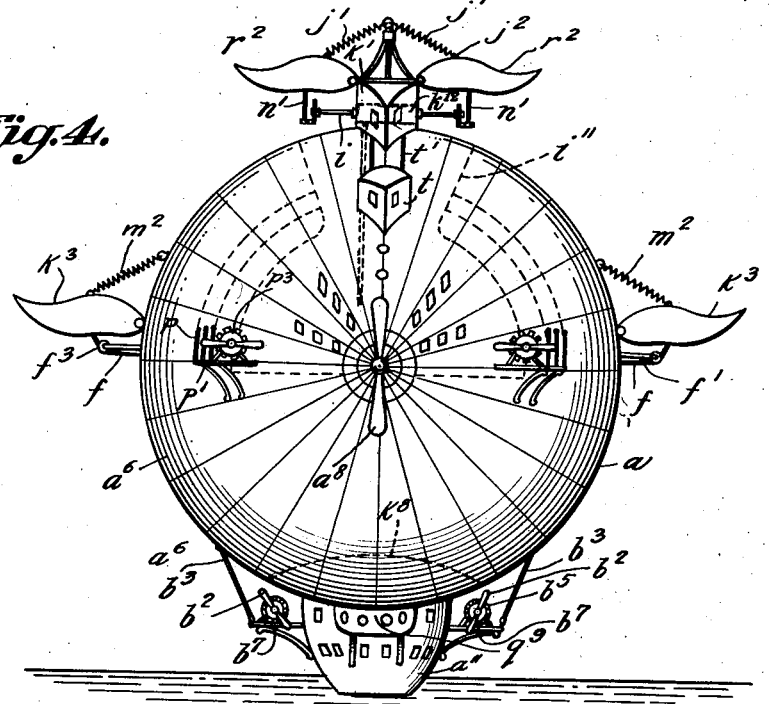
Fig. 4 is a detailed front view of Fig. 1.
Figure 5:
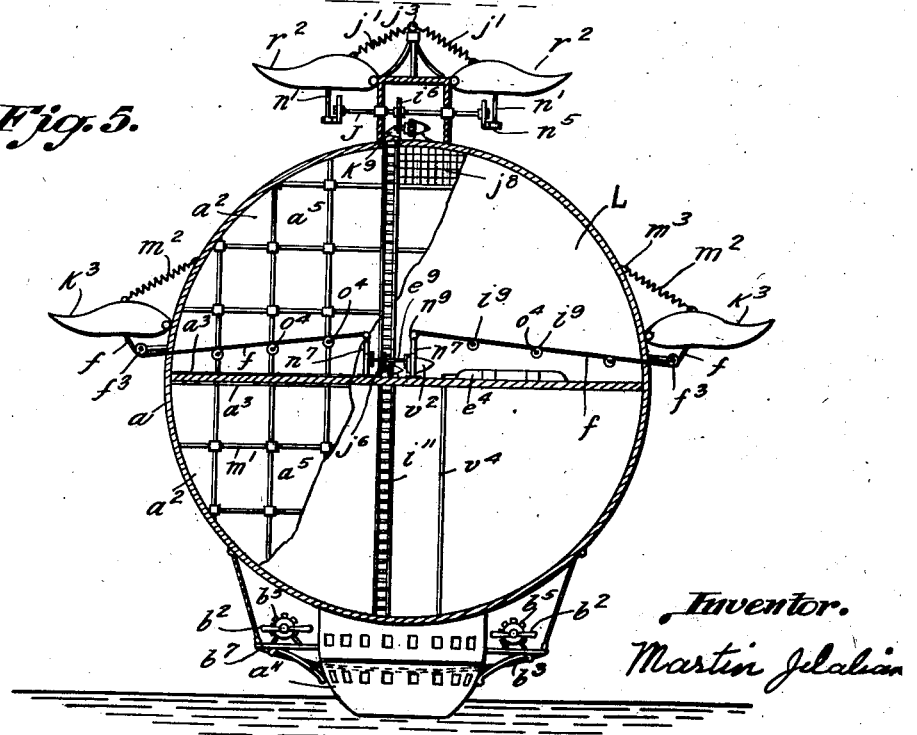
Fig. 5 illustrates a detailed transverse sectional view of the gas-bag inclosing frame as relative with its flat bottom gas-bags as arranged within the same and also showing the relative movements of the main centrally arranged vertically reciprocating wings within the spaces as arranged between each adjacent compartment.

Referring to the drawings, Figs. 2 and 5, $a$ designates a gas-bag inclosing frame which may be constructed in a usual suitable manner by rivet connections. Said gas-bag inclosing frame $a$ is provided with a series of centrally and transversely arranged main connecting supports $a^1$, $a^1$ from the forward to the rear end thereof thus dividing the latter equally into two compartments $a^2$, $a^2$ forming upper and lower main compartments which extend longitudinally from the forward to the rear end of the said gas-bag inclosing frame $a$.

The upper main longitudinally extending compartment $a^2$ is divided into six separate compartments, four flat bottom gas-bag containing compartments which support gas-bags $a^5$, $a^5$ and two minor vacant compartments $t^{10}$ and $t^6$, one at the forward and also one at the rear end thereof and having fixed platforms $t^2$ and $t^7$ secured to the main transversely extending connecting supports $a^1$ $a^1$ while the lower main compartment $a^2$ is divided equally into four separate gas-bag compartments containing gas-bags $a^5$ $a^5$.

Each of said gas-bags $a^5$, $a^5$ of the upper main compartments $a^2$, $a^2$ is provided with a flat wire frame $a^3$ inclosed in and secured upon the top of the said centrally and transversely extending main connecting supports $a^1$, $a^1$ thus forming a flat bottom gas-balloon extending longitudinally to gas-bag inclosing frame $a$ within each gas-bag compartment and adapted to fill out the same. The gas-bags $a^5$, $a^5$ of the lower main compartment $a^2$ are also provided with wire frames $a^3$, $a^3$ and secured upon the bottoms of the said transversely extending main connecting supports $g^{12}$, $g^{12}$, in the same manner as the gas-bags of the upper main compartment which is divided into four gas-bag containing compartments with the exception that the lower gas-bags $a^5$ are up-side down, thus each pair of the adjacent gas-bags $a^5$, $a^5$ one above the other of the upper and lower main compartments forming a spherical shaped gas-balloon in transverse section.

A narrow space L is arranged between the adjacent gas-bag compartments which is provided with a fixed platform $a^4$ having a cylindrical water tank $e^4$ mounted upon the said platform and provided with water pipe connection $v^4$.

Extending outwardly above said platforms $a^4$, $a^4$ opposite to the said spaces L, L of the gas-bag inclosing frame $a$ are three pairs of alike-sets of main centrally arranged vertically reciprocating wings $k^3$, $k^3$ three on each side which are located opposite one another having their inner ends pivotally connected to the gas-bag inclosing frame as shown at $r^3$, $r^3$ and extending outwardly therefrom.

Each of said main wings $k^3$ is made of longitudinally extending main supports $v$, $v$; and also have transversely arranged connecting wing supports $j^{11}$, $j^{11}$. A wire netting $v^5$ is secured to the said supports and an outer layer of fine tin $v^3$ applied to the same.

Arranged above said main vertically reciprocating wings $k^3$, $k^3$ are a pair of main coil pull-spring connections $m^2$, $m^2$ having one of their ends connected to the integral hooks $o^3$, $o^3$ and the other ends secured to the hooks $m^3$, $m^3$ integral with the gas-bag inclosing frame $a$.

The inner ends of the said main wings $k^3$, $k^3$ that are arranged with pivotal connections $r^3$, $r^3$ are also provided with a pair of main horizontally arranged coil pull-springs $k^9$, $k^9$ one at each inner end thereof, which are designed to support said wings and to facilitate the upward movements of the same with the coil pull-springs $m^2$, $m^2$.

Located beneath each of said wings are a pair of fixed supports $f^1$, $f^1$ supporting a pulley $f^3$, a main pull wing rope $f$ having one of its ends secured to the said main longitudinally extending wing supports $v$, $v$ and also transverse connecting supports $j^{11}$, $j^{11}$ and extends centrally and longitudinally beneath said main wing $k^3$ and passes through the bottom of said pulley $f^3$ and projects through the inclosing frame $a$ and thence extends centrally and longitudinally above platform $a^4$ running over a series of alike-sets of pulleys $o^5$, $o^5$ secured upon supports $o^4$, $o^4$ connected to the transversely extending supports $m^1$, $m^1$.

Located centrally within each space L, L upon a fixed platform $a^4$ are a pair of vertically arranged main wing rope supporting fork shaped slideable members $n^7$, $n^7$ arranged opposite one another longitudinally to the platform $a^4$.

A wing rope operating arm $r^9$ for each of the said main vertically reciprocating wings $k^3$, $k^3$ which comprises two flat sided sections having pivotal connections $v^9$, $v^9$ the upper sections slideably mounted within the vertically arranged support members $n^7$, $n^7$ and the lower sections provided with eyelets and loosely mounted upon integral shaft $v^6$, $v^6$, projecting outwardly from the outer circumference of the wheels $n^5$, $n^5$ beneath the fork shaped vertical supports $n^7$, $n^7$. A shaft $e^9$ is arranged between said vertically extending supports $n^7$, $n^7$ which extends longitudinally to the platform $a^4$ and having chain connections $j^6$ and $j^8$ with motor $v^2$ arranged longitudinally to the platform $a^4$ to drive said shaft $e^9$.

The lower portion of the vertical slideable members $n^7$, $n^7$ are fork shaped in order to permit the relative movements of the wing rope operating arms $r^9$, $r^9$. Secured at the upper ends of the vertically arranged slideable members $n^7$, $n^7$ are rope pulleys $n^9$, $n^9$ mounted upon shafts $t^9$, $t^9$.

The wing rope supporting arms $r^9$, $r^9$ are provided with integral hooks at their upper ends to receive wing ropes $f$, $f$ which run over pulleys $n^9$ and $o^5$ longitudinally to the space L centrally beneath said main vertically reciprocating wings $k^3$, $k^3$ extending outwardly from each side of the gas-bag inclosing frame $a$.

In Fig. 9 is shown the wing rope supporting arms $r^9$, $r^9$ as in normally released position and in Fig. 10 they are shown as in partly compressed position within the vertically arranged slideable members $n^7$, $n^7$.

Thus it will be readily understood that when shaft $e^9$ operates the upper portions of the wing rope supporting arms $r^9$, $r^9$ will have up and down sliding movements within the oppositely arranged vertical slidable members $n^7$ and thus make the main wings $k^3$, $k^3$ receive up and down reciprocating movement in the manner of the wings of a bird.

The wing supporting ropes $f$, $f$ must be made of suitable flexible woven wires.

Secured forwardly and centrally upon each side of the gas-bag inclosing frame $a$ adjacent to the forward platform $t^{10}$ are revolving propellers $p^2$, $p^2$ driven by motors $p^3$, $p^3$ which are secured upon side projecting fixed platforms $p^1$, $p^1$, and located at the forward end thereof is a revolving propeller $a^8$ secured upon shaft $a^7$ provided with integral gear $b^1$ at its rear end and having chain connection $a^9$ with motor $a^{10}$ mounted upon platform $t^2$ of the vacant compartment $t^{10}$.

As a further security for the said side projecting platforms $p^1$, $p^1$ a guard wire-strip $p$ is arranged which has one of its ends secured to one of the platforms $p^1$ and projecting upwardly and thence passes through the outer layer $a^6$ of the gas-bag inclosing frame $a$ and extends upwardly over the top of the latter and has its other end connected to the opposite side projecting platform $p^1$.

The forward vacant compartment $t^{10}$ is provided with a series of windows $p^5$, $p^5$ upon each side thereof and also has ladder connection $p^{11}$ extending upwardly to the observation lobby $t$ located centrally and forwardly upon the top of the gas-bag inclosing frame $a$ rearwardly above said forward vacant compartment $t^{10}$; and extending rearwardly from said lobby $t$ is a wire gangway $t^1$.

The rear vacant compartment $t^6$ is also provided with a series of windows $p^5$, $p^5$ upon each side thereof and also having ladder connection $p^8$ extending upwardly into a fixed wire gang-way $t^5$ arranged centrally and longitudinally upon the top of the gas-bag inclosing frame $a$.

Located centrally within said wire gang-way $t^5$ is an observation lobby $t^3$ and secured rearwardly to said lobby $t^3$ at the rear end of the gas-bag inclosing frame $a$ are usual form operated flat vertical and horizontal rudders $t^{11}$ and $p^6$.

Extending centrally and longitudinally upon the top of the gas-bag inclosing frame $a$ between the wire gang-ways $t^1$ and $t^5$ is a fixed gang-way wing compartment $k^1$ which supports three pairs of alike sets of vertically reciprocating wings $r^2$, $r^2$ three on each side arranged opposite one another and having their inner ends hingedly connected along the top of the said gang-way $k^1$ as shown at $r^3$, $r^3$ and projecting outwardly therefrom above the said gas-bag inclosing frame $a$.

A horizontal wing-shaft $j^1$ supported by vertical and longitudinal supports $j^5$ and $j^9$ is arranged for each pair of said wings $r^2$, $r^2$ which extends transversely to the said gang-way wing compartment centrally beneath said wings $r^2$, $r^2$ and is provided with an integral wheel $n^5$ at each end thereof.

Pivotally connected to the longitudinally and transversely arranged wing supports $v$ and $j^{11}$ are a series of wing supports $r^5$, $r^5$ which have their lower ends hingedly connected to a flat circular support $j^4$ located centrally beneath each of said wings $r^2$, $r^2$. Each of said wings $r^2$, $r^2$ is provided with a wing supporting arm $n^1$ having its lower end arranged with an eyelet $v^{11}$ and operatively mounted upon an integral shaft $v^4$ that is projecting outwardly from the outer circumference of an integral wheel $n^5$ and having its upper end pivotally connected upon the bottom of a flat circular support $j^4$.

Shaft $j$ is driven by motor $j^7$ arranged transversely to the gang-way $k^1$ and has chain connection $j^6$ running over integral gear $j^8$ mounted upon said wing-shaft $j$.

The longitudinally extending compartment wings $r^2$, $r^2$ are also provided with longitudinally and transversely extending wing supports $v$ and $j^{11}$ and wire nettings and outer layers of tin $v^3$, $v^3$ in the same manner as the main centrally arranged vertically reciprocating wings $k^3$, $k^3$ and also coil pull-spring connections $j^1$, $j^1$ having one of their ends secured to the integral hooks $j^2$, $j^2$ and the other ends connected to the vertical supports $j^3$, $j^3$ supported by horizontal connecting supports $j^{10}$, $j^{10}$.

The longitudinally extending wing compartment $k$ which is provided with windows $r^{11}$ and $r^6$ upon each side thereof is also arranged with water-tanks $k^{12}$, $k^{12}$ at the forward and the rear end thereof having water-pipe connections $m^{11}$, $m^{11}$, the forward end tank water pipe connection extending forwardly in the forward vacant compartment $t^{10}$ and also the rear end water-tank pipe connection extending rearwardly within the gas-bag inclosing frame $a$ and projecting into rear end vacant compartment $t^6$.

The spaces L, L are separated from the adjacent gas-bag compartments by vertically and horizontally arranged supports $m$ and $m^1$ which are connected to the gas-bag inclosing frame $a$ provided with a wire netting $j^8$ and an outer layer of fine tin thus forming side walls oppositively of the gas-bags $a^5$, $a^5$. The object of applying tin in the manner as described is for protection against fire passing from one compartment to the other.

Strips of fine tin $b^{12}$ are also arranged around the outer circumference of each of said spaces L, L which encircle said gas-bag-inclosing frame $a$ all around the spaces L, L and are provided with a series of windows $b^2$, $b^2$ all around encircling the said spaces L, L.

The gas-bag inclosing frame $a$ is provided with an outer layer of canvas $a^6$.

Located beneath the said gas-bag inclosing frame $a$ centrally below the said spaces L, L are three alike sets of integral cars $a^{11}$, $a^{11}$, each of said cars comprising four main frames as frames $I^2$, $I^3$, $I^4$ and $I^5$ having a series of vertically extending connecting supports $f^{11}$, $f^{11}$ all around the same connected to the latter and passing through the same and their upper ends rigidly connected to the gas-bag inclosing frame $a$, a wire netting $O^6$ is applied to the said connecting supports of the said main frames and an outer layer of fine tin $b^9$ secured to the netting. The lower portions $a^9$, $a^9$ of the said main integral cars $a^{11}$, $a^{11}$ are especially adapted to travel on water.

The inner sections of the said main integral cars $a^{11}$, $a^{11}$ may be suitably and firmly constructed but it will not be necessary to use metal except in connections within the main frames $I^2$, $I^3$ and $I^4$ in forming floors which form the bases of the same.

Connected to and projecting outwardly from the upper frames $I^2$, $I^2$ of each of the said main integral cars $a^{11}$, $a^{11}$ are a pair of alike sets of fixed motor platforms $b^7$, $b^7$ which are located forwardly and rearwardly upon each side of the said main integral cars $a^{11}$, $a^{11}$ and project outwardly therefrom.

Secured upon the tops of the said side projecting platforms $b^7$, $b^7$ are motors $b^5$, $b^5$ which drive propellers $b^2$, $b^2$.

As a further security for the said outwardly projecting motor platforms $b^7$, $b^7$ a flexible wire guard strip $b^3$ is arranged for each set of the latter which has one of its ends connected to the outer end portion of one of the said outwardly projecting motor platforms $b^7$ and extending over the top of the gas-bag inclosing frame $a$ and its opposite end being connected to the outer end portion of the opposite side projecting motor platform $b^7$.

In Fig. 5 is shown the said guard wire-strips $b^3$ as connected to the said side extending motor platforms $b^7$, $b^7$ and as projecting centrally through the main integral cars $a^{11}$ and encircling said gas-bag inclosing frame $a$.

Fixed ladders $i$ are also arranged within the spaces L, L centrally upon each side of the sidewalls opposite one another which extend from each of said main cars $a^{11}$, $a^{11}$ and project through the gas-bag inclosing frame $a$ upwardly through the platforms $a^4$, $a^4$ and thence extend into the longitudinally arranged gang-way wing-compartment $k^1$.

A coil spring cushion landing device is shown in Fig. 6 which is designed to serve as a cushion for the said main integral cars $a^{11}$, $a^{11}$ when descending and to support the same when on the ground.

Each set of said coil-spring cushion devices comprises a longitudinally extending flat sided shaft support member $f^5$, $f^5$ which is secured upon the bottom of the lower main frame $i^5$ of the main integral car $a^{11}$ and provided with a series of integral collars and also integral slideable shafts $f^6$, $f^6$ projecting therefrom, a threaded member $f^9$ having a series of integral tubular members $f^2$, $f^2$ each inclosing a coil spring and mounted upon the end portions of the said integral slideable shafts $f^6$, $f^6$ and also having coil-spring connections $f^4$, $f^4$ which surround said slideable shafts $f^6$, $f^6$.

Flexible guard wire strips $q^5$, $q^5$ are also arranged for each set of the said threaded members $f^9$, $f^9$ which extend from the latter to the said main cars $a^{11}$, $a^{11}$.

Located between the adjacent main cars $a^{11}$, $a^{11}$ centrally within the wire gang-ways $b^8$ are two alike sets of integral minor wing-supporting cars $e^5$, $e^5$.

Extending outwardly from each side of the said wing supporting cars $e^5$, $e^5$ are a pair of minor cooperative vertically reciprocating wings $k^5$, $k^5$ arranged side by side each set opposite one another and having pivotal connections $r^3$, $r^3$ along the tops of said cars $e^5$, $e^5$ and projecting outwardly therefrom.

Extending longitudinally to the outer sides of the said minor wing supporting cars $e^5$, $e^5$ and transversely beneath the said minor cooperative vertically reciprocating wings $k^5$, $k^5$ are wing-shafts $j$, $j$ supported by shaft-supports $r^9$, $r^9$ which are connected to and project outwardly from the sides of the said minor cars $e^5$, $e^5$. Mounted upon platforms within the bottoms of each of said minor wing supporting cars $e^5$, $e^5$ are a pair of motors $p^{11}$, $p^{11}$ located opposite one another one of the same driving one of the said wing-shafts $j$ extending centrally and longitudinally on the outer side of one of said minor cars $e^5$ by chain-connection $p^9$ and the other driving the other wing-shaft $j$ located on the opposite side in the same manner.

The minor cooperating vertically reciprocating wings $k^5$, $k^5$ are constructed in the same manner as the longitudinally extending gang-way compartment wings $r^2$, $r^2$ upon the top of the gas-bag inclosing frame $a$ as detailed in Fig. 8, provided with wing supports $v$ and $j^{11}$, wire nettings and layers of fine tin $v^3$ secured to the same with the exception that the wing-shafts are arranged longitudinally instead of transversely for operating each pair of wings.

Said minor wings $k^5$, $k^5$ are also provided with springs $v^9$, $v^9$ upon the tops of the same, having one of their ends connected to the hooks $j^2$, $j^2$ provided upon the tops of the same and the other ends secured to the hooks $v^7$, $v^7$ integral with the gas-bag inclosing frame $a$.

Fixed gang-ways $b^8$, $b^8$ are arranged between the minor wing supporting cars $e^5$, $e^5$ and the adjacent main integral cars $a^{11}$, $a^{11}$ which extend longitudinally beneath the gas-bag inclosing frame $a$ to pass from one car to the other and having longitudinally and vertically extending connecting supports secured to the top main frames of the main integral cars $a^{11}$, $a^{11}$ and also minor wing-supporting cars $e^5$ and are provided with an outer layer of fine tin.

The minor wing-supporting cars $e^5$, $e^5$ are constructed in the same manner as the main integral cars $a^{11}$, $a^{11}$ provided with main frames and vertically arranged connecting supports, wire nettings and an outer layer of fine tin all around the same with the exception that each of the said minor wing-supporting cars $e^5$, $e^5$ comprises two main frames instead of four forming upper and lower frames.

A wire netting and also an outer layer of fine tin may also be applied all around the longitudinal gang-way wing compartment $k^1$ in the same manner as the pass gang-ways $b^8$, $b^8$ beneath the ship In order to make the flapping movements of the main centrally arranged vertically reciprocating wings $k^3$, $k^3$ slowly instead of speedily, each of the wing-rope supporting shafts $e^9$ within the space L may be arranged to be driven by gear-connections if desired instead of having chain connection with the motor $v^2$, that is to say, said shaft may be provided with a pair of large gears $n^{12}$ meshing with the smaller gears $L^{12}$ of a shaft $L^{11}$ that may be located forwardly and horizontally to said wing-shaft $e^9$ and provided with chain connection with motor $v^2$ in the manner as shown by Fig. 14. The gang-way compartment wings $r^2$, $r^2$ and also minor cooperative vertically reciprocating wings may also be arranged to be driven by gear connections so as to reduce the speedy flapping movements of the same if desired in the manner as described.

Each space L, L between the adjacent compartments is provided with a water-tank $e^4$ mounted upon a fixed platform $a^4$ having water-pipe connection $v^4$ extending downwardly into each of the said cars $a^{11}$, $a^{11}$.

A cylindrical water-tank $k^{12}$ is also arranged centrally within the longitudinal wing compartment $k^1$ which is located upon the fixed platform of the latter and has water-pipe connections to be used within the same and also upon the outersides of the gas-bag inclosing frame $a$ when necessary.

The gas-bag inclosing frame $a$ which is provided with a wire netting $a^7$ all around the same and having an outer layer of canvas $a^6$ and also outer layers of strips of fine tin surrounding the spaces L, L between the adjacent compartments is also arranged with fixed side-ladders $o^1$, $o^1$.

The arrangement of wire nettings and outer layers of fine tin for the certain parts of the craft is specially for protection against fire and also the arrangement of the water-tanks and water-pipe connections are mostly for the same purpose.

The forwardly arranged propellers around the forward vacant compartment $t^{10}$ and also the propellers beneath the ship upon the sides of the main integral cars $a^{11}$, $a^{11}$ may also be made of suitable metal such as aluminum.

In Fig. 11 is shown a modified form of arrangement for the gas-bags. In this modification the upper and also the lower main longitudinally extending compartments $a^2$, $a^2$ are each divided equally into two separate compartments by a series of centrally and vertically extending main connecting supports $a^{10}$, $a^{10}$ which are arranged from the forward to the rear end of the said gas-bag inclosing frame $a$ thus forming four gas-bag compartments as compartments 1, 2, 3, and 4 and containing gas-bags $u^3$, $u^3$, each detachable section secured to a guard wire frame $r^{12}$ which extends longitudinally within the gas-bag inclosing frame $a$ and adapted to fill out the said guard wire frame $r^{12}$.

Each gas-bag $u^3$, $u^3$ is provided with a gas-bag inclosing frame $a^3$ and secured upon the tops of the centrally and transversely extending main connecting supports $a^1$, $a^1$ and having a wire netting $u^{11}$ and also an outer layer of fine tin $o^8$ secured all around the same; said gas-bags $u^3$, $u^3$ extend longitudinally to the gas-bag inclosing frame $a$ within the compartments 1, 2, 3, and 4.

In this modified form the main centrally arranged vertically reciprocating wings $k^3$, $k^3$ are arranged in pairs in the same manner as the minor cooperative wings $k^5$, $k^5$ beneath the ship located side by side centrally upon each side of the gas-bag inclosing frame $a$ and also provided with shafts $j$, $j$ extending longitudinally to the gas-bag inclosing frame $a$ beneath said wings $k^3$, $k^3$ upon each side of the ship and supported by supports $r^9$, $r^9$ and having wing supporting arm connections $n^1$, $n^1$ and also chain connections $p^9$, $p^9$ with motors $r^{11}$, $r^{11}$ which are located upon platforms $a^4$, $a^4$ that are arranged within the spaces L, L between the adjacent compartments.

In this modified arrangement as shown in Fig. 11, the gas-bag inclosing frame $a$ is provided with outwardly projecting longitudinally extending fixed side gang-ways $u^5$, $u^5$ upon each side of the same forming upper and lower side projecting gang-ways, the upper side projecting gang-ways extending from the forward vacant compartment to the rear vacant compartment and the lower side projecting gang-ways extending from below the forward platform $a^4$ of the forward space L rearwardly below the centrally arranged platform $a^4$ of the rear space L between the rear adjacent compartments.

This modified form as described allows the crew to freely travel all around within the gas-bag inclosing frame $a$ provided with wide spaces extending longitudinally and transversely to the same and platforms $i^3$, $i^3$ are also arranged which extend centrally and longitudinally from the forward to the rear end thereof.

The upper longitudinal platform $i^3$ is also provided with water-tanks $L^{10}$ having water-pipe connections $L^9$, $L^9$ extending outwardly to the gas-bag inclosing frame $a$ and projecting into side gang-ways $u^5$, $u^5$.

The water tanks $e^4$, $e^4$ upon the centrally arranged platforms $a^4$, $a^4$ within the spaces L, L are also provided with water pipe connections $v^4$, $v^4$ projecting outwardly to the gas-bag inclosing frame $a$ and extending into the lower side projecting gang-ways $u^5$, $u^5$ upon each lower side of the ship.

Vertically arranged fixed ladders $o^{10}$ are arranged which extend centrally and upwardly from one platform to the other.

A propeller $k^2$ is also arranged centrally between each adjacent set of main vertically reciprocating wings $k^3$, $k^3$ two upon each side of the ship which are located upon side projecting fixed platforms $k^{11}$, $k^{11}$ and driven by motors $p^4$, $p^4$.

The platforms within the spaces L, L may be arranged three instead of one, one above and also one below the centrally arranged main platforms $a^4$ if desired.

This arrangement as described in Fig. 11 is most convenient for military purposes.

Thus it will be obvious that by the arrangement of the propellers centrally and forwardly of the ship and also the propellers upon the sides of the main integral cars with the minor cooperative vertically reciprocating wings beneath the ship, the three alike sets of main centrally arranged vertically reciprocating wings upon each side of the ship and also the three sets of vertically reciprocating wings upon the sides of the longitudinally extending gang-way compartment above the ship as described will afford the ship with a great amount of lifting capacity and also great speed and the parts of the craft are so arranged that the same can not be destroyed by fire and the latter is perfectly safe in every manner to travel a long distance.

It is preferable to have the main integral cars $a^{11}$, $a^{11}$ constructed in the manner as shown by Fig. 6 for passenger service, each comprising four stories instead of two or three, the top floor to be served as a parcel room, the next floor below as a passengers' room provided with a series of usual form side arranged double passenger seats along both sides of the same, the next floor below as a combined passenger and lunch room, and the next floor below, which will be the bottom floor, may be provided with suitable light equipments for driving the ship on water.

Adjustable ladders $i^5$ are arranged upon the sides of the main integral cars $a^{11}$, $a^{11}$ which are designed to receive and also let off passengers.

The said pull-rope operated ladders $i^5$, $i^5$ which are hingedly connected to the fixed platforms $i^2$, $i^2$ each between a pair of coil pull springs $b^{11}$, $b^{11}$ (the said platforms $i^2$, $i^2$ projecting outwardly opposite to the entrances that are arranged upon the sides of the main cars $a^{11}$, $a^{11}$) are each provided with a flexible wire pull-rope $i^{11}$ which is connected centrally within the lower end thereof and extends upwardly to the shaft $i^3$ and adapted to spin thereon so as to easily raise and lower the same when necessary. The shaft $i^8$ which is supported by a pair of vertical flat sided fixed supports $i^4$, $i^4$ within the main car $a^{11}$ is arranged with a main integral gear $i^3$ which meshes with a smaller integral gear that is provided upon a hand operated crank-shaft $i^{10}$ located horizontally below the said shaft $i^8$ which passes through the said flat sided vertical supports $i^4$, $i^4$ and also passes through the same.

Thus it will be made obvious that when the upper shaft $i^8$ operates by the gear connection of the lower crank-shaft $i^{10}$ on right the rope $i^{11}$ will centrally spin over said shaft $i^8$ thus causing the ladder $i^5$ (when in normally released position) to be normally raised up in a vertical position oppositively to the entrance of the main car $a^{11}$ when not in use as shown in Fig. 6.

When crank-shaft $i^{10}$ is operated to lower the ladder $i^5$ for the purpose of receiving or discharging passengers, the lower portion of the said ladder $i^5$ which has been raised and made vertical opposite to the entrance, as shown in Figure 6, will be gradually released downwardly and the ladder will assume a downwardly inclined position opposite to the lower portion $a^9$ of the main integral car $a^{11}$ as shown by Fig. 12 in a normally released position.

The gas-bag inclosing frame $a$ is also provided with a long strip of tin $k^8$ as an outer layer which extends forwardly from the forward end of the main integral car $a^{11}$ rearwardly behind to the rear end of the rear main integral car $a^{11}$ and surrounds all of said main integral cars $a^{11}$, $a^{11}$ and also minor wing supporting cars $e^5$, $e^5$ including all of the said gang-ways $b^8$, $b^8$ as shown with dotted lines.

A wide long strip of tin $k^6$ is also applied longitudinally over the top of the said gas-bag inclosing frame $a$ as an outer layer which extends from the forward end over the top of the forward vacant compartment $t^{10}$ rearwardly to the rear end of the rear vacant compartment $t^6$ and surrounding the longitudinally extending wing-compartment $k^1$ and the wire gang-ways $t^1$ and $t^5$ including lobbies $t$ and $t^3$, dotted lines showing the position of the layer of tin as applied.

A layer of tin may also be applied to the flat horizontal and vertical rudders $p^6$ and $t^{11}$ as an outer layer.

In constructing the main integral cars $a^{11}$, $a^{11}$ for military purposes it will not be necessary to have four stories, two or three will be sufficient as the vacant compartments $t^{10}$ and $t^6$ over the top of the gas-bag inclosing frame a which are provided with platforms and also the platforms $a^{11}$, $a^{11}$ within the spaces L, L of the adjacent compartment may also be suitably equipped to serve for military purposes.

The forward main integral car a is provided with a forwardly projecting portion $q^9$ extending forwardly from the forward end thereof, which is designed to serve as a captain's compartment.

Thus having described the invention what I claim as new and desire to secure by Letters Patent is:

1. An apparatus of the character described comprising a gas-bag inclosing frame provided with a series of main centrally and transversely extending connecting supports from the forward to the rear end thereof and equally dividing the said gas-bag inclosing frame into two main separate compartments forming upper and lower main compartments, the upper main compartment being divided into six separate compartments, four major gas-bag compartments and two minor vacant compartments, one at the forward end and also one at the rear end thereof and the lower main compartment being equally divided into only four major gas-bag compartments, a gas-bag within each of the said major gas-bag compartments and extending longitudinally to the same and each provided with wire frame within the same and secured upon the tops of the said main centrally and transversely extending connecting supports and adapted to fill out the said major gas-bag compartment, gas-bags within the lower gas-bag compartments of the lower main compartment and also provided with flat wire frames and secured upon the bottoms of the said main transversely extending connecting supports and also adapted to fill out the said gas-bag compartments and each adjacent top and bottom gas-bag of the said upper and lower main compartments forming a spherical gas-balloon in a transverse section, a narrow space between each set of the adjacent gas-bag containing compartments, a revolving propeller at the forward end of the said gas-bag inclosing frame and having a shaft entering within the said forward vacant compartment and provided with a chain connection, a motor mounted upon a platform for driving said propeller, a revolving propeller forwardly and centrally upon each side of the said gas-bag inclosing frame rearwardly adjacent to the said forward vacant compartment and located upon fixed platforms projecting outwardly from each side of the said gas-bag inclosing frame, a guard wire strip for each of the said platforms passing over top of the gas-bag inclosing frame and having its ends connected to the outer ends of said outwardly projecting platforms, and ladders extending from said forward and rear vacant compartments into longitudinally extending fixed wire gang-ways arranged upon the top of the said gas-bag inclosing frame.

2. An apparatus of the character described comprising a gas-bag inclosing frame consisting of two main longitudinally extending compartments forming upper and lower main compartments extending from the forward to the rear end thereof, the upper main compartment comprising four major gas-bag containing compartments and two minor vacant compartments one at the rear and also one at the forward end thereof and the lower main compartment consisting of four equally divided major gas-bag containing compartments, a space between each set of the said adjacent gas-bag containing compartments and having fixed platforms extending centrally and longitudinally within said spaces arranged transversely to the said gas-bag inclosing frame, three main integral cars secured beneath the said gas-bag inclosing frame and provided with fixed pass gang-ways located between the adjacent main integral cars, a fixed gang-way wing compartment upon the top of the said gas-bag inclosing frame, and extending longitudinally to the same, three pairs of alike sets of vertically reciprocating wings upon each side of the said longitudinally extending wing compartment and having their inner ends hingedly connected along the top of the latter and projecting outwardly therefrom above the said gas-bag inclosing frame, and each of said wings comprising longitudinally and transversely extending wing supports, a wire netting and an outer layer of fine tin, a wing shaft beneath each opposite set of said wings and extending centrally and transversely to the said longitudinally arranged gang-way wing compartment and each provided with an integral wheel at each end thereof and also having an integral shaft projecting outwardly therefrom, three pairs of motors within the said gang-way wing compartment located transversely upon a fixed platform and each provided with chain connections for driving said wing shafts, a wing supporting arm beneath each of said wings having their upper ends pivotally connected to flat circular supports having a series of connecting wing supports hingedly connected to the bottoms of said wings and their lower ends provided with eyelets and loosely mounted upon the end portions of the integral shafts projecting outwardly from the outer circumferences of the integral wheels of the said wing shafts, coil pull spring arrangements above said wings, an observation lobby forwardly of the said longitudinally extending gang-way wing compartment upon the top of the gas-bag inclosing frame, an observation lobby rearwardly of the latter and arranged centrally within a fixed wire gang-way extending rearwardly from the rear end of the said gang-way wing compartment and water pipe connections extending from the latter into the said forward and rear vacant compartments of the said gas-bag inclosing frame.

3. An apparatus of the character described comprising a gas-bag inclosing frame consisting of two main longitudinally extending compartments forming upper and lower main compartments extending from the forward to the rear end thereof, the upper main compartment comprising four major gas-bag containing compartments and also two minor vacant compartments one at the rear and also one at the forward end thereof, and the lower main compartment consisting of four equally divided major gas-bag containing compartments, three pairs of alike sets of centrally arranged main vertically reciprocating wings upon each side of the said gas-bag inclosing frame and having their inner ends provided with a pair of coil pull spring connections and also pivotally connected centrally to the said gas-bag inclosing frame and projecting outwardly therefrom, and the said wings comprising a pair of longitudinally extending main wing supports having a series of transversely arranged connecting supports, a wire netting secured to the said supports, and an outer layer of fine tin applied to the same, a main wing rope beneath each of said wings and having one of its ends connected to the said longitudinally and transversely extending wing supports and passing over the bottom of a pulley supported by a pair of fixed supports projecting outwardly from the gas-bag inclosing frame centrally beneath said wings and projecting into the space between the adjacent gas-bag containing compartments and thence passing over the top of a series of alike sets of pulleys arranged within the said space and having the other end connected to the upper ends of a pair of wing rope operating arms slidably mounted within a pair of oppositely arranged vertical fork shaped fixed supports located centrally upon a fixed platform arranged within spaces of the said adjacent gas-bag containing compartments, a wing shaft between each set of the said vertical oppositely arranged fork shaped supports and each provided with an integral wheel at each end thereof and also having integral shafts projecting therefrom to loosely receive the lower portions of the said wing operating arms, a motor located centrally and longitudinally upon each of the said platforms and provided with chain connections for driving said shafts, main coil pull spring connections arranged in pairs above said wings and connected upon the top of said wings and extending to the said gas-bag inclosing frame.

4. An apparatus of the character described comprising a gas-bag inclosing frame consisting of two main longitudinally extending compartments forming upper and lower main compartments being equally divided into two sections and extending from the forward to the rear end of the said gas-bag inclosing frame, the upper main compartment consisting of four equally divided gas-bag containing compartments and two minor vacant compartments, one at the rear and also one at the forward end thereof and the lower main compartment comprising four equally divided gas-bag containing compartments, a gas-bag within each of the said gas-bag compartments and each provided with a flat wire frame within the same and adapted to fill out the compartment, a space between each pair of the said adjacent compartments and having fixed platforms arranged centrally of the same, and said spaces comprising side walls opposite one another and each of the same consisting of a series of vertically and horizontally arranged main connecting supports, a wire netting and an outer layer of tin, water tanks upon the platforms of the said spaces and provided with water-pipe connections extending downwardly and projecting into main integral cars secured beneath the said gas-bag inclosing frame centrally below said spaces, fixed ladders extending upwardly from the said main integral cars and projecting through the platforms of the said spaces arranged between the adjacent gas-bag compartments and thence extending into a longitudinally arranged gang-way wing compartment located upon the top of the said gas-bag inclosing frame, a strip of tin secured to and surrounding the outer circumference of each of said spaces and having windows arranged all around the same.

5. An apparatus of the character described comprising a gas-bag inclosing frame having a combined outer layer of fine tin and canvas and said gas-bag inclosing frame provided with a series of main centrally and transversely extending connecting supports from the forward to the rear end thereof and equally dividing the latter into two main separate compartments forming upper and lower main compartments, the upper main compartment being divided into six separate compartments, four major gas-bag containing compartments and two minor vacant compartments, one at the forward and also one at the rear end thereof, and the lower main compartment being equally divided into only four major gas-bag containing compartments, gas-bags within the gas-bag compartments of the said upper and lower main compartments and provided with flat wire frames and secured on the tops and bottoms of the said centrally and transversely extending main connecting supports, a space between each pair of the said adjacent gas-bag containing compartments, three main integral cars located beneath the said gas-bag inclosing frame centrally below the said spaces and each provided with a series of side arranged double passenger seats within both sides of the same, and each of said main integral cars comprising four main frames forming upper and lower frames and provided with a series of vertically arranged main connecting supports all around the same, having their upper ends rigidly connected to the bottom of the said gas-bag inclosing frame, a wire netting applied to the said supports and an outer layer of tin secured to the netting, a pair of alike sets of motor platforms arranged forwardly and rearwardly projecting outwardly from each side of each of the said main integral cars and having motors secured upon the tops of the same and each motor driving one propeller beneath the said gas-bag inclosing frame, and each set of the said platforms connected to the top frame of the said main integral car and projecting outwardly therefrom, a guard wire strip for each opposite set of the said side projecting motor platforms and having one of its ends secured to the outer end of the same and projecting upwardly and thence passing over the top of the gas-bag inclosing frame and having its opposite end connected to the opposite side outwardly projecting motor platform, a minor wing supporting car arranged between the adjacent main integral cars and located centrally within a fixed pass gang-way extending centrally and longitudinally beneath the said gas-bag inclosing frame.

6. An apparatus of the character described comprising a gas-bag inclosing frame provided with a series of main centrally and transversely extending connecting supports from the forward to the rear end thereof, and dividing the latter equally into two main separate compartments forming upper and lower main compartments, the upper main compartment being divided into six separate compartments, four major gas-bag containing compartments and two minor vacant compartments, one at the rear and also one at the forward end thereof, and the lower main compartment being equally divided into only four major gas-bag containing compartments, gas-bags within the gas-bag compartments of the said upper and lower main compartments and provided with flat wire frames and secured upon the tops and bottoms of the said centrally arranged transversely extending main connecting supports, three alike sets of main integral cars beneath the said gas-bag inclosing frame and arranged centrally below the spaces formed between the adjacent gas-bag containing compartments of the said upper and lower longitudinally extending main compartments, a minor cooperative wing supporting car between each adjacent main integral cars and located centrally between fixed pass-gang-ways which extend centrally and longitudinally beneath the said gas-bag inclosing frame and having secured there-to and also to the upper frames of the said main integral and minor wing supporting cars, two pairs of alike sets of minor cooperative vertically reciprocating wings upon each side of each of the said minor wing supporting cars, and having their inner ends pivotally connected to the upper frame of the latter and projecting outwardly there from beneath the said gas-bag inclosing frame, a wing shaft for each set of said wings and located centrally upon the outer sides of the said minor wing supporting cars and extending longitudinally to the same and supported by a pair of fixed shaft supports projecting outwardly from the said minor wing supporting cars, a pair of oppositely arranged motors within the latter and each provided with chain connections for driving one of the said wing shafts, a wing supporting arm connection beneath each of said wings and provided with eyelets and loosely mounted upon the integral shafts projecting outwardly from the outer circumferences of integral wheels that are arranged upon the end portions of said wing shafts, said wings comprising longitudinally and transversely extending connecting supports, wire nettings and outer layers of fine tin, coil pull springs arranged above said wings and connected upon the top of the same and extending to the said gas-bag inclosing frame.

7. An apparatus of the character described comprising a gas-bag inclosing frame provided with a series of main centrally and transversely extending connecting supports from the forward to the rear end thereof and equally dividing the latter into two main separate compartments, forming upper and lower main compartments, the upper main compartment being divided into six separate compartments, four major gas-bag containing compartments and two minor vacant compartments and the lower main compartment being equally divided into only four major gas-bag containing compartments, three alike sets of main integral cars beneath the said gas-bag inclosing frame and located centrally below the spaces formed between the adjacent gas-bag containing compartments of the said upper and lower longitudinally extending main compartments, a forwardly projecting portion from the forward end of the forward main integral car and designed to serve as a captain's compartment, pull-rope operated adjustable ladders upon the sides of the said main integral cars arranged opposite to the entrances and designed to receive and let off passengers there from, a pair of minor wing supporting cars beneath the said gas-bag inclosing frame and each located between the adjacent main integral cars, fixed pass-gang ways provided with outer layers of fine tin arranged between the said main integral and minor wing supporting cars and ladders extending from each side of the said gas-bag inclosing frame into a longitudinally extending gang-way wing compartment arranged upon the top of the same.

8. An apparatus of the character described comprising a gas-bag inclosing frame provided with a series of main centrally and transversely extending connecting supports from the forward to the rear end thereof and equally dividing the latter into only two main separate compartments, forming upper and lower main compartments, the upper main compartment being divided into six separate compartments, four major gas-bag containing compartments and two minor vacant compartments, one at the rear and also one at the forward end thereof, and the lower main compartment being equally divided into only four major gas-bag containing compartments, three alike sets of main integral cars beneath the said gas-bag inclosing frame and located centrally below the spaces formed between the adjacent gas-bag containing compartments, a wide strip of layer tin secured upon the bottom of the said gas-bag inclosing frame as an outer layer and extending from forwardly of the forward main integral car rearwardly behind the rear end of the rear main integral car and surrounding the main integral and also minor wing supporting cars including the pass gang ways there between, a strip of layer of tin upon the top of the said gas-bag inclosing frame and extending from the forward end rearwardly to the rear end of the same and passing over forward and rear vacant compartments and surrounding the gang-way wing compartment including lobbies and wire gang-ways forwardly and rearwardly of the latter, a series of alike sets of coil spring cushion devices secured to the side walls of the said main integral cars and each comprising a flat sided shaft support member secured to the bottom frame of the latter and having integral slidable shafts projecting there from, a thread member provided with integral tubes and slidably mounted upon the end portions of said shafts, coil spring connections within the said tubular members, coil springs surrounding said slidable shafts and having connected to the end portions of the said tubular members and to the integral collars of said shaft support members.

MARTIN JELALIAN.